United States Patent
Song et al.

(10) Patent No.: US 12,288,936 B1
(45) Date of Patent: Apr. 29, 2025

(54) METHOD FOR FAST AUTOMATIC CALIBRATION OF PHASED ARRAY BASED ON RESIDUAL NEURAL NETWORK

(71) Applicants: ZHEJIANG UNIVERSITY, Zhejiang (CN); DONGHAI LABORATORY, Zhejiang (CN)

(72) Inventors: Chunyi Song, Zhoushan (CN); Haotian Chen, Zhoushan (CN); Nayu Li, Zhoushan (CN); Zhiwei Xu, Zhoushan (CN); Xinhong Xie, Zhoushan (CN); Zixian Ma, Zhoushan (CN); Bing Lan, Zhoushan (CN)

(73) Assignees: ZHEJIANG UNIVERSITY, Zhoushan (CN); DONGHAI LABORATORY, Zhoushan (CN)

( * ) Notice: Subject to any disclaimer, the term of this patent is extended or adjusted under 35 U.S.C. 154(b) by 0 days.

(21) Appl. No.: 18/991,311

(22) Filed: Dec. 20, 2024

(30) Foreign Application Priority Data

Feb. 2, 2024 (CN) .......................... 202410150604.8

(51) Int. Cl.
*H01Q 3/26* (2006.01)
*G06T 5/20* (2006.01)
*G06V 10/44* (2022.01)

(52) U.S. Cl.
CPC .............. *H01Q 3/267* (2013.01); *G06T 5/20* (2013.01); *G06V 10/454* (2022.01)

(58) Field of Classification Search
CPC ......... H01Q 3/267; G06V 10/454; G06T 5/20
See application file for complete search history.

(56) References Cited

U.S. PATENT DOCUMENTS

2002/0059022 A1  5/2002  Breed et al.

FOREIGN PATENT DOCUMENTS

| CN | 107831488 A |   | 3/2018 |   |
|----|-------------|---|--------|---|
| CN | 111693976 A | * | 9/2020 | ............ G01S 13/02 |

(Continued)

OTHER PUBLICATIONS

He, Guolong, Xin Gao, and Rentian Zhang. "Impact analysis and calibration methods of excitation errors for phased array antennas." IEEE Access 9 (2021): 59010-59026 (Year: 2021).*

(Continued)

*Primary Examiner* — Peter M Bythrow
*Assistant Examiner* — Nazra Nur Waheed
(74) *Attorney, Agent, or Firm* — PORUS IP LLC

(57) ABSTRACT

Disclosed is a method for fast automatic calibration of a phased array based on a residual neural network. A phase setting matrix is set and an amplitude and a phase of a array far-field complex signal are measured with a network analyzer to obtain an amplitude and phase vector of the array far-field complex signal. A real part, an imaginary part, and a magnitude of the far-field measured complex signal value are separated and normalized, and mapped to RGB three-channel image data. Datasets are automatically generated according to a preset amplitude-phase error range by a simulation software, the datasets are proportionally divided into a training set and a test set to be input into the residual neural network for training to obtain a calibration model. Measured data is input into the calibration model for automatic estimation of the amplitude-phase error of the phased array.

6 Claims, 6 Drawing Sheets

(56) References Cited

FOREIGN PATENT DOCUMENTS

| | | |
|---|---|---|
| CN | 111987462 B | 6/2021 |
| CN | 112881972 A | 6/2021 |
| CN | 113400954 A | 9/2021 |
| CN | 116047436 A | 5/2023 |
| CN | 117055273 A | 11/2023 |
| CN | 117313542 A | 12/2023 |
| WO | 2022095510 A1 | 5/2022 |

OTHER PUBLICATIONS

Leng, Lemeng, et al. "Phase calibration for integrated optical phased arrays using artificial neural network with resolved phase ambiguity." Photonics Research 10.2 (2022): 347-356. (Year: 2022).*

"Phased Array Antenna (XII): Introduction to Antenna Calibration Technology Simulation—Rotation Vector Method", Web page <https://blog.csdn.net/qq_23176133/article/details/128138431>, Dec. 8, 2022, 21 pages.

"Phased Array Antenna Patterns—Part 1: Linear Array Beam Characteristics and Array Factor", Web page <https://zhuanlan.zhihu.com/p/614626189>, Mar. 19, 2023, 32 pages.

"Microwave darkroom", Web page <https://baike.baidu.com/item/%E5%BE%AE%E6%B3%A2%E6%9A%97%E5%AE%A4/9798882>, Nov. 11, 2024, 9 pages.

"Phase Shifter", Web page <https://baike.baidu.com/item/%E7%A7%BB%E7%9B%B8%E5%99%A8/77766>, Dec. 6, 2021, 7 pages.

First Office Action in Chinese Application No. 202410150604.8 mailed on Aug. 8, 2024, 12 pages.

Notification to Grant Patent Right for Invention in Chinese Application No. 202410150604.8 mailed on Aug. 16, 2024, 4 pages.

Tetsuya Iye et al., Neural Network-Based Phase Estimation for Antenna Array Using Radiation Power Pattern, IEEE Antennas and Wireless Propagation Letters, 21(7): 1348-1352, 2022.

Henry Leung, A hopfield neural tracker for phased array antenna, IEEE Transactions on Aerospace and electronic systems, 33(1): 301-307, 1997.

Cheng, Yanmin et al., Defect Identification From Phased Array Ultrasonic Testing Images Based on Multilayer Neural Network, Nondestructive Testing Technology, 46(6): 6-10, 2022.

Bai, Moyu et al., Beamforming algorithm for deep neural network using knowledge distillation, Journal of Telemetry, Tracking and Command, 41(1): 66-72, 2020.

* cited by examiner

Basic residual block

Basic residual block with a downsampling layer

METHOD FOR FAST AUTOMATIC CALIBRATION OF PHASED ARRAY BASED ON RESIDUAL NEURAL NETWORK

CROSS-REFERENCE TO RELATED APPLICATIONS

This application claims priority to the Chinese Patent Application No. 202410150604.8, filed on Feb. 2, 2024, entitled "A method for fast automatic calibration of a phased array based on a residual neural network", the entire contents of which are incorporated herein by reference.

TECHNICAL FIELD

The present disclosure relates to the field of radio frequency and millimeter wave phased arrays, and in particular to a method for fast automatic calibration of a phased array based on a residual neural network.

BACKGROUND

In recent years, phased arrays have an increasingly important role in modern radar and communications. In the production and use of the phased arrays, due to manufacturing errors, production inaccuracies, and non-uniform mutual coupling between antennas, the amplitude and phase of each channel may be inconsistent. These errors cause the beam deviating from the expected value, and compromise the accuracy of beam alignment and beamforming.

The conventional phased array far-field calibration methods mainly include the single-element calibration methods and the multi-element calibration methods. By changing the phase value of a single array element, the single-element calibration methods measure the change in the electric field intensity of a synthetic electric field and find the maximum and minimum values of the electric field intensity to calculate the amplitude-phase error of the specific element within each calibration cycle, such as the rotating-element electric-field vector method. However, the rotating-element electric-field vector method needs to traverse all phase states of each array element's phase shifter to determine the extremum of the electric field intensity. Only one array element can be calibrated at a time, and the calibration efficiency is low. In addition, the rotating-element electric-field vector method causes multiple sets of indistinguishable solutions, resulting in incorrect estimation of amplitude-phase errors. The multi-element calibration methods improve the calibration efficiency by simultaneously shifting the phases of multiple array elements in each calibration cycle. However, the error accumulates to the first array element, making the calibration accuracy lower than that of the single-element calibration method. With the continuous development of the phased arrays, the scale of integrated arrays is gradually increasing, which puts forward higher requirements for the efficiency and accuracy of the calibration method.

Therefore, it is desirable to provide a method for fast automatic calibration of a phased array based on a residual neural network to improve the efficiency and accuracy of beamforming and beam modulation.

SUMMARY

The objective of the present disclosure is to provide a method and device for fast automatic calibration of a phased array based on residual neural network, and a computer storage medium to address the problems that the conventional phased array calibration methods require a large number of measurements and have low accuracy.

One or more embodiments of the present disclosure provide a method for fast automatic calibration of a phased array based on a residual neural network. The method may comprise the following operations including:

S1: setting a phase setting matrix, changing a phase shifter of each antenna element in turn, and measuring an amplitude and a phase of an array far-field complex signal corresponding to each antenna element with a network analyzer to obtain an amplitude and phase vector of the array far-field complex signal of which a magnitude is equal to a count of measurements;

S2: performing feature extraction on the amplitude and phase vector, separating and normalizing a real part, an imaginary part, and a magnitude of a value the measured array far-field complex signal, and mapping to RGB three-channel image data;

S3: constructing the residual neural network and automatically generating a large number of datasets according to a preset amplitude-phase error range by a simulation software, proportionally dividing the datasets into a training set and a test set and inputting the training set and the test set into the residual neural network for training to obtain a calibration model;

S4: inputting measured data into the calibration model for automatic estimation of the amplitude-phase error of the phased array.

One or more embodiments of the present disclosure further provide a device for fast automatic calibration of a phased array based on a residual neural network. The device may comprise a storage device; and a processor connected with the storage device. The processor may be configured to perform the method described above.

One or more embodiments of the present disclosure further provide a non-transitory computer storage medium storing computer programs that, when executed by a computer, may direct the computer to implement the method described above.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, where.

DETAILED DESCRIPTION

Figure 1:
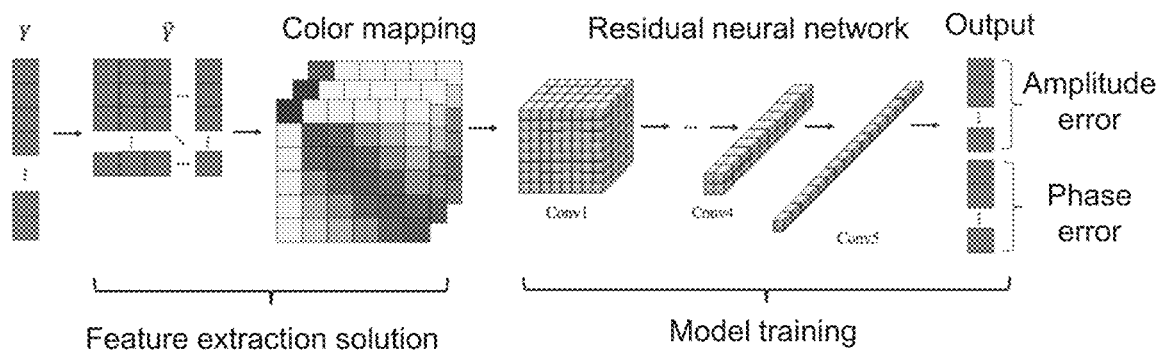
FIG. 1 is a flowchart illustrating a method for fast automatic calibration of a phased array based on a residual neural network according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device", "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one", "a", "an", "one kind", and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

As shown in FIG. 1, some embodiments of the present disclosure disclose a method for fast automatic calibration of a phased array based on a residual neural network. The method may include the following operations.

In S1, a phase-setting matrix is set up, a phase shifter of each antenna element is changed in turn, and an amplitude and a phase of an array far-field complex signal corresponding to each antenna element are measured with a network analyzer to obtain an amplitude and phase vector of the array far-field complex signal of which a magnitude is equal to a count of measurements.

The magnitude being equal to the count of measurements refers to that a count of elements in the vector is equal to the count of measurements. One element in the vector corresponds to one measurement of the amplitude and the phase of the array far-field complex signal.

In some embodiments, a vector characterizing the amplitude and the phase of the array far-field complex signal may be denoted as a far-field complex signal vector Y.

The phased array refers to a phase compensation array. The phased array may be configured to receive or transmit a signal. In some embodiments, the phased array may include a plurality of antenna elements and phase shifters. The antenna elements refer to parts for transmitting and/or receiving electromagnetic waves. A planar array refers to an array consisting of the antenna elements. A measurement noise matrix refers to a part for measuring noise features. An element spacing refers to a distance between two neighboring antenna elements in the planar array. In some embodiments, array elements may be the antenna elements.

The phase setting matrix may be configured to control a phase shifter to change a phase. In some embodiments, the elements in the phase setting matrix may be phase modification values of the phase shifter.

The phase shifter refers to a part configured to adjust the phase of an antenna elements. In some embodiments, a phase shifter may correspond to an antenna elements.

The network analyzer refers to a device for measuring the amplitude and the phase of a signal. In some embodiments, the network analyzer may be a vector network analyzer.

The array far-field complex signal refers to a signal emitted by the phased array.

In S2, feature extraction is performed on the amplitude and phase vector, and a real part, an imaginary part, and a magnitude part of a value the measured array far-field complex signal are separated and normalized, and then mapped to RGB three-channel image data.

For example, the processor may perform feature extraction on the far-field complex signal vector Y, separate the real part, the imaginary part, and the amplitude of the measured array far-field complex signal, normalize the values corresponding to the real part, the imaginary part, and the amplitude, and then map the normalized data to the RGB three-channel image data.

The RGB three-channel image data refers to image data of three color channels. Color information of an image may be expressed by a change in the three color channels of red (R), green (G), and blue (B) and an overlay thereof.

In S3, the residual neural network is constructed, and a large number of datasets are automatically generated according to a preset amplitude-phase error range by a simulation software, and the datasets are proportionally divided into a training set and a test set to be input into the constructed residual neural network for training to obtain a calibration model.

The simulation software refers to a tool for test simulation. The amplitude-phase error range refers to an acceptable error range for the amplitude of the array far-field complex signal.

In S4, measured data is input into the calibration model for automatic estimation of the amplitude-phase error of the phased array.

The measured data refers to the RGB three-channel image data after measurement of the network analyzer, feature extraction, and mapping.

In some embodiments of the present disclosure, the operation S1 may be implemented by the following suboperations.

In S1.1, assuming that a phased array of size $N_x \times N_y$ is used as the antenna under test, a transmitting antenna is a single probe, and calibration is performed in an anechoic chamber; a signal angle of the probe to a planar array is denoted as (θ,φ), where θ denotes a pitch angle, and φ denotes an azimuth angle, a received signal y of the phased array under an ideal condition may be modeled as:

$$y = X(\theta,\phi) \odot s + n \tag{1}$$

where s denotes a signal from a probe of size $N_x N_y \times 1$, n denotes a measurement noise matrix in an anechoic chamber environment of size $N_x N_y \times 1$, and $\odot$ denotes a Hadamard product.

$X(\theta,\phi)$ denotes a direction vector at (θ,φ) of an array of size $N_x N_y \times 1$.

$$X(\theta, \varphi) = Tx(\theta) \otimes Ty(\varphi) \tag{2}$$

$$\begin{cases} Tx(\theta) = \left[1, e^{i2\pi \frac{d_x}{\lambda} \sin\theta \sin\varphi}, \ldots, e^{i2\pi(N_x-1)\frac{d_x}{\lambda}\sin\theta \sin\varphi}\right]^T \\ Ty(\varphi) = \left[1, e^{i2\pi \frac{d_y}{\lambda} \sin\theta \cos\varphi}, \ldots, e^{i2\pi(N_y-1)\frac{d_y}{\lambda}\sin\theta \cos\varphi}\right]^T \end{cases} \tag{3}$$

where 1 denotes a wavelength, dx and dy denote an element spacing of array elements in rows and an element spacing of array elements in columns, respectively, $Tx(\theta)$ denotes a direction vector of an array of size $N_x N_y \times 1$ in a direction θ, and $Ty(\phi)$ denotes a direction vector of an array of size $N_x N_y \times 1$ in a direction q.

The amplitude-phase error caused by a production process error, a manufacturing error, a material parameter error, and mutual coupling between antennas, etc., may be modeled as an error matrix A of size $N_x N_y \times N_x N_y$:

$$A = \begin{bmatrix} a_1 e^{-i\omega_1} & 0 & \ldots & 0 \\ 0 & a_2 e^{-i\omega_2} & \vdots & 0 \\ \vdots & \vdots & \ldots & \vdots \\ 0 & 0 & \ldots & a_{N_x N_y} e^{-i\omega_{N_x N_y}} \end{bmatrix} \tag{4}$$

where $a_j$ denotes an initial amplitude error of a jth array element, $w_j$ denotes an initial phase error of the jth array element, and i denotes an ith measurement.

The amplitude-phase error is data used to characterize an error between an actual signal emitted by the phased array and an ideal signal, and may include amplitude-phase error information of each array element in the phased array. In some embodiments of the present disclosure, the amplitude-phase error may be represented by the error matrix A.

The anechoic chamber refers to an enclosed space used for measuring electromagnetic Interference (EMI) and electromagnetic susceptibility (EMS).

In S1.2, in order to obtain amplitude-phase error information of each array element, a phase setting matrix P of size $L \times N_x N_y$ is set:

$$P = \begin{bmatrix} \vartheta_{1,1} & \vartheta_{1,2} & \ldots & \vartheta_{1,N_x N_y} \\ \vartheta_{2,1} & \vartheta_{2,2} & \vdots & \vartheta_{2,N_x N_y} \\ \vartheta_{3,1} & \vartheta_{3,2} & \ldots & \vartheta_{3,N_x N_y} \\ \vdots & \vdots & \ddots & \vdots \\ \vartheta_{L,1} & \vartheta_{L,2} & \ldots & \vartheta_{L,N_x N_y} \end{bmatrix} \tag{5}$$

wherein, $\vartheta_{i,j}$ denotes a phase value corresponding to the phase shifter of the jth array element in the ith measurement, and thus each row of P represents a phase value corresponding to a phase shifter of each array element of the phased array of size $N_x \times N_y$ in a phase shift, and L denotes the count of measurements.

In S1.3, after amplitude and phase data of the array far-field complex signal of the phased array is measured by setting different phases for the phase shifter, the far-field complex signal vector Y of a phased array of size $L \times 1$ is obtained:

$$Y = PAX(\theta,\phi) \odot s + n \tag{6}$$

In some embodiments, the operation S2 may be implemented by the following suboperations.

In S2.1, the received far-field complex signal vector Y of the phased array is reconstructed as a complex signal matrix $\tilde{Y}$ of size $\lceil \sqrt{L} \rceil \times \lceil \sqrt{L} \rceil$:

$$\tilde{Y} = \begin{bmatrix} Y(1) & Y(2) & \ldots & Y(\lceil \sqrt{L} \rceil) \\ Y(\lceil \sqrt{L} \rceil + 1) & Y(\lceil \sqrt{L} \rceil + 2) & \vdots & Y(2\lceil \sqrt{L} \rceil) \\ Y(2\lceil \sqrt{L} \rceil + 1) & Y(2\lceil \sqrt{L} \rceil + 2) & \ldots & Y(3\lceil \sqrt{L} \rceil) \\ \vdots & \vdots & \ddots & \vdots \\ Y(\lceil \sqrt{L} \rceil^2 - \lceil \sqrt{L} \rceil + 1) & Y(\lceil \sqrt{L} \rceil^2 - \lceil \sqrt{L} \rceil + 2) & \ldots & 0 \end{bmatrix} \tag{7}$$

where $\lceil \cdot \rceil$ denotes rounding up.

The elements of the far-field complex signal vector Y are populated into the complex signal matrix Y in the order of rows. When $\lceil \sqrt{L} \rceil^2 > L$, a count of amplitudes and phases of the measured array far-field complex signal of the phased array are not exactly populated into the whole matrix Y, and thus the remaining of $\tilde{Y}$ is populated with 0.

In S2.2, three feature matrices, i.e., a real part matrix $\tilde{Y}_{real}$, an imaginary part matrix $\tilde{Y}_{imag}$, and a magnitude matrix $\tilde{Y}_{am}$, are calculated according to the complex signal matrix $\tilde{Y}$, and the three feature matrices are normalized and mapped to the RGB three-channel image data:

$$\tilde{Y}_{real} = \frac{255(\text{Re}(\tilde{Y}) + \max(|\tilde{Y}|))}{2\max(|\tilde{Y}|)} \tag{8}$$

$$\tilde{Y}_{imag} = \frac{255(\text{Im}(\tilde{Y}) + \max(|\tilde{Y}|))}{2\max(|\tilde{Y}|)} \tag{9}$$

$$\tilde{Y}_{am} = \frac{255|\tilde{Y}|}{\max(|\tilde{Y}|)} \tag{10}$$

where real(•) denotes the real part of the matrix, imag(•) denotes the imaginary part of the matrix, and max(•) denotes maximum value of the matrix.

In some embodiments, the far-field complex signal data of the phased array is reconstructed and mapped to the RGB three-channel image data by a new feature extraction method, such that accurate calibration can be achieved with only a minimum count of measurements equal to the count of the array elements, which is conducive to achieving higher calibration efficiency.

In some embodiments, the operation S3 may be implemented by the following suboperations.

In S3.1, the residual neural network is constructed;

In S3.2, assuming that a range of an array element phase error is $\pm \omega_{all}$, and a range of an array element amplitude error is $\pm I_{all}$, M sets of amplitude-phase errors are randomly generated based on $\pm \omega_{all}$ and $+I_{all}$ by the simulation software. A certain range may include the range of the array element phase error and the range of the array element amplitude error;

a complex form of a corresponding array element amplitude-phase error is calculated based on the amplitude-phase errors, and the complex form of the corresponding array element amplitude-phase error is divided into a real part vector of size $N_xN_y \times 1$ and an imaginary part vector of size $N_xN_y \times 1$ as labels of the datasets of the neural network, the size of the label corresponding to each dataset being $2N_xN_y \times 1$ In S3.3, M far-field complex signal vectors corresponding to the M sets of amplitude-phase errors are calculated according to the operation S1;

In S3.4, the RGB three-channel image data corresponding to the M array element far-field complex signal vectors is calculated according to the operation S2 as datasets for training of the neural network; where the training of the neural network refers to training of the residual neural network;

In S3.5, the M datasets are proportionally divided into the training set and the test set to input into the constructed neural network for training to obtain the calibration model.

Further, suboperation S1.2 may be implemented by the following operations.

In S1.2.1, in order to obtain the amplitude-phase error information of all the array elements in the phased array, the phase setting matrix P needs to satisfy the following equation (11):

$$\text{rank}(P) \geq N_x N_y \quad (11)$$

where rank(•) represents the rank of the matrix;

In S1.2.2, this embodiment describes a construction process of a phase setting matrix $P_s$ using calibration of a small phased array as an example. The small phased array refers to a phased array with a small or limited scale. In some embodiments, the small phased array refers to a phased array of which antenna elements is less than a preset count. For example, the preset count may be 1000 or some other value, which may be determined based on actual needs.

For example, the phase setting matrix $P_s$ may be constructed as:

$$P_s = \begin{bmatrix} 0 & 0 & \cdots & 0 \\ \pi & 0 & \vdots & 0 \\ 0 & \pi & \cdots & 0 \\ \vdots & \vdots & \ddots & \vdots \\ 0 & 0 & \cdots & \pi \end{bmatrix} \quad (12)$$

Firstly, a far-field amplitude and phase of the phased array at $(\theta,\phi)$ are measured directly, where all the array elements do not perform phase shifting, corresponding to a first row of $P_s$;

then, a phase of a phase shifter of an individual array element is moved by 180° in the order of the array elements, and the far-field amplitude and phase at $(\theta,\phi)$ are measured, corresponding to a second row to a $(N_xN_y+1)$th row of $P_s$, to obtain a far-field complex signal vector Y of size $(N_xN_y+1) \times 1$.

In some embodiments, the processor may also set the phase setting matrix $P_s$ based on a preset rule. For example, a phase of at least one array element in the phased array may be set in accordance with a preset state for the first measurement; for a non-first measurement, the at least one array element in the phased array may be shifted by a preset phase on the basis of a phase setting corresponding to the previous measurement.

The preset state may include a preset phase of the at least one array element in the phased array, which may be determined based on priori experience and/or historical data. The preset phase may be a randomly generated phase adjustment value.

In some embodiments, the preset phase may be also correlated with the calibration accuracy of the previous measurement.

Each row in the phase setting matrix corresponds to the phase of the phased array at the time of one measurement. In some embodiments, the processor may perform automatic estimation of the amplitude-phase errors of the phased array based on the far-field complex signal vector Y acquired in the first measurement through the calibration model after the first measurement, and determine the calibration accuracy corresponding to the first measurement based on a result of the automatic estimation. At the second measurement, a preset phase corresponding to the second measurement may be determined based on the calibration accuracy corresponding to the first measurement. For example, the higher the calibration accuracy corresponding to the first measurement, the smaller the preset phase corresponding to the second measurement.

The first measurement and the second measurement refer to two consecutive measurements, and the first measurement precedes the second measurement.

More descriptions regarding the calibration model may be found in the operation S3 and the operation S4 and the related descriptions thereof. More descriptions regarding the calibration accuracy and the determination thereof may be found in FIG. 7 and the related descriptions thereof.

In some embodiments, the residual neural network constructed in the operation S3.1 may include five convolution sets, including conv1, conv2, conv3, conv4, and conv5;

The conv1 includes a basic convolution computation process, which sequentially consists of a convolution layer with a convolution kernel of size 3×3 and a step size 1, a batch normalization (BN) layer, and an activation function layer using a ReLu activation function, and is connected with a maximum pooling layer of size 3×3 and a step size 1.

The conv2 includes two identical basic residual blocks.

The conv3, the conv4, and the conv5 include a basic residual block with a downsampling layer and a basic residual block. The first residual block is the basic residual block with the downsampling layer, a step size of a first convolution layer of the basic residual block with the downsampling layer is 2 for downsampling, and other parameters are the same.

The method provided in some embodiments of the present disclosure may realize simultaneous calibration of all the array elements, which significantly reduces the count of measurements and improves the calibration efficiency. The neural network; is trained using a large number of datasets generated by the simulation software. After sufficient training, the neural network only needs to perform forward inference operation in the prediction phase, which avoids complex matrix operations and improves real-time calibration efficiency.

Figure 2:
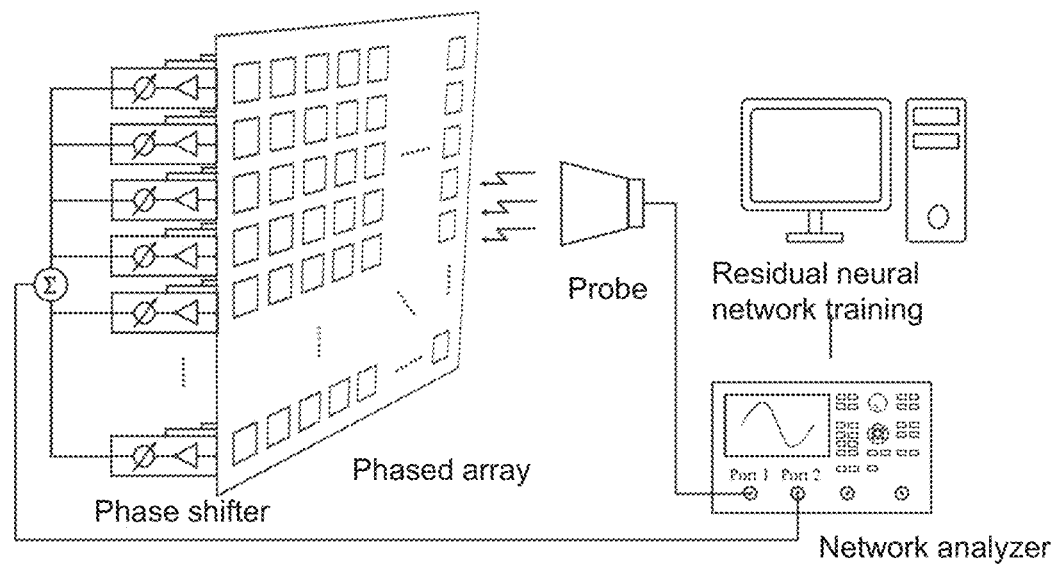
FIG. 2 is a schematic diagram illustrating a measurement platform of a method for fast automatic calibration of a phased array based on a residual neural network according to some embodiments of the present disclosure.

FIG. 2 is a schematic diagram illustrating a measurement platform of a method for fast automatic calibration of a phased array based on a residual neural network according to some embodiments of the present disclosure. A magnitude and a phase of a corresponding array far-field complex signal are measured with a network analyzer in an anechoic chamber, and the calibration and testing of all the beams of a multibeam phased array are completed at one time, which substantially improves the test efficiency.

Figure 3:
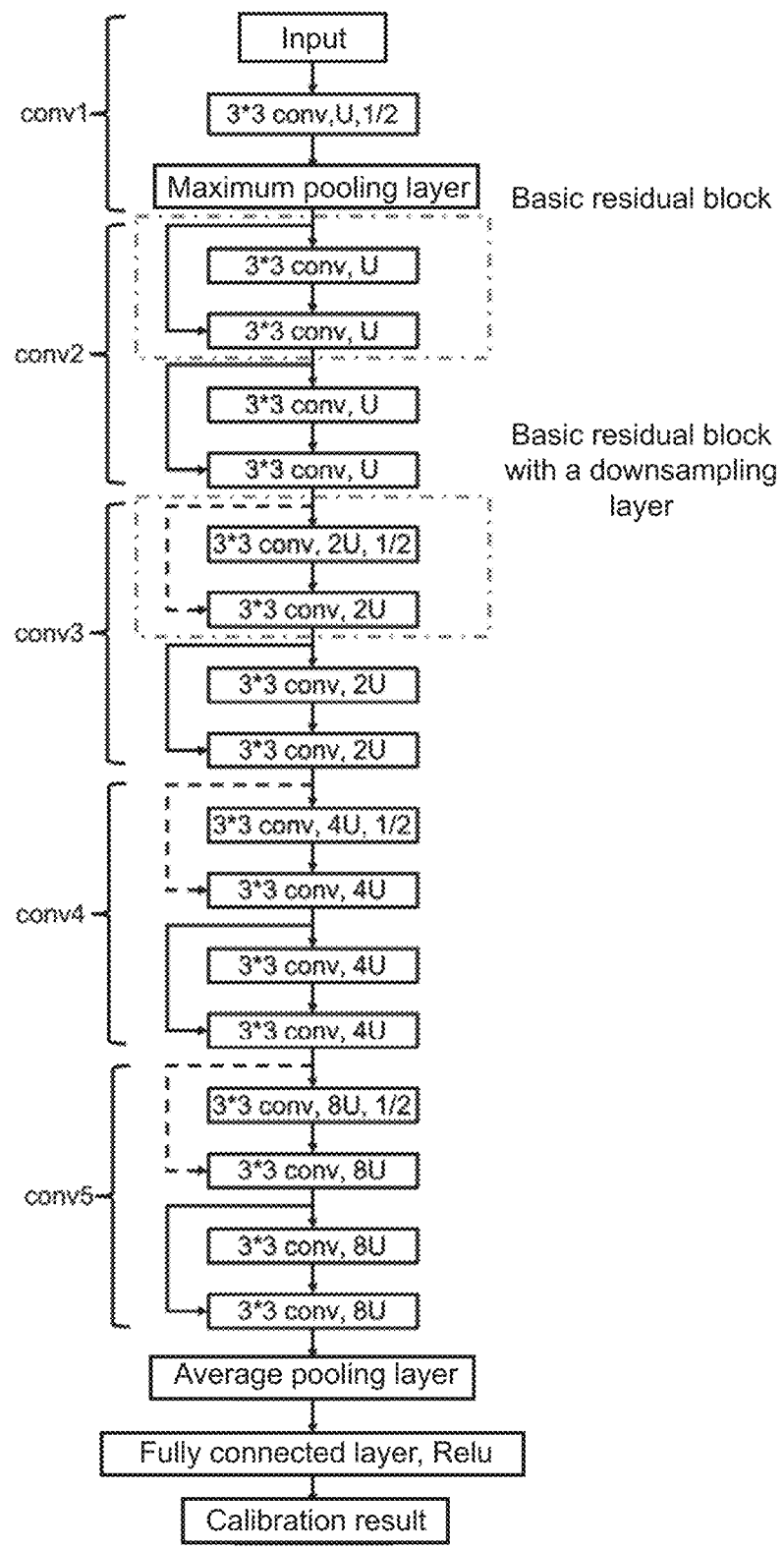
FIG. 3 is a structural diagram illustrating a residual neural network of a method for fast automatic calibration of a phased array based on a residual neural network according to some embodiments of the present disclosure.

FIG. 3 is a structural diagram illustrating a residual neural network of a method for fast automatic calibration of a phased array based on a residual neural network according to some embodiments of the present disclosure. The neural network may include five convolution sets, including conv1, conv2, conv3, conv4, and conv5.

The conv1 includes a convolution computation process, which sequentially consists of a convolution layer with a convolution kernel of size 3×3 and a step size 1, a BN layer, and an activation function layer using a Relu activation function, and is connected with a maximum pooling layer of size 3×3 and a step size 1.

The conv2 includes two identical basic residual blocks.

The conv3, the conv4, and the conv5 include one basic residual block with a downsampling layer and one basic residual block, and all other parameters are the same.

The data passes through five residual units and enters an average pooling layer and a fully connected layer of which an activation function is Relu, and expands a three-dimensional array into a one-dimensional vector and outputs the one-dimensional vector.

Under normal circumstances, small image data cannot be fed directly into a neural network for training. In some embodiments of the present disclosure, a lightweight residual neural network is designed and network parameters are improved for phased array calibration, which reduces the count of convolution layer output channels, and improves the training speed of the neural network.

In some embodiments, an input of the residual neural network may include the RGB three-channel image data, and an output of the residual neural network may include results of automatic estimation of the error.

In some embodiments, the processor may perform downsampling on the RGB three-channel image data according to preset parameters in the conv1.

The preset parameters are a collection of preset parameters configured to reduce a sampling rate.

In some embodiments, the processor may determine historical sampling parameters that satisfy a candidate condition as candidate sampling parameters in historical training data of the residual neural network, and select a candidate sampling parameter with the highest appearance frequency as a preset sampling parameter from the candidate sampling parameters. If there is a plurality of candidate sampling parameters with the highest appearance frequency, the processor may randomly select one of the plurality of candidate sampling parameters with the highest appearance frequency as the preset sampling parameter.

In some embodiments, the candidate condition may be correlated with at least one of the reliability and the calibration accuracy of a calibration model obtained by training based on the historical sampling parameters.

In some embodiments of the present disclosure, the candidate condition may be that the reliability of a historical calibration model obtained by training based on the historical sampling parameters is not less than a reliability threshold. The reliability threshold may be determined based on priori experience and/or actual needs. More descriptions regarding the reliability and the determination thereof may be found in FIG. 7 and the related description thereof.

In some embodiments, the candidate condition may be correlated with the calibration accuracy. For example, the candidate condition may include the historical calibration model obtained by training based on the historical sampling parameters, and the calibration accuracy of the historical calibration model may not be less than an accuracy threshold. The accuracy threshold may be determined based on priori experience and/or actual needs. More descriptions regarding the calibration accuracy and the determination thereof may be found in FIG. 7 and the related description thereof.

In some embodiments, by taking the calibration accuracy of the historical calibration model as one candidate condition, the preset parameters that may obtain a better model accuracy can be obtained by screening, so as to make the trained calibration model have a better accuracy.

In some embodiments of the present disclosure, by performing downsampling on the RGB three-channel data input to the residual neural network, the data complexity and computational requirements can be reduced, thereby improving the data processing efficiency. By downsampling, the model pays more attention to the key features in the data, such that the model has better generalization ability.

In some embodiments, the datasets used for training the residual neural network may include a plurality of sample datasets. Different learning rates may be used for training the residual neural network using different sample datasets.

The learning rate refers to a parameter that controls a step size when model parameters are updated during model training. The learning rate determines a magnitude of the parameter update along a direction where the loss function decreases the fastest during the training of the residual neural network by gradient descent (or other optimization algorithms).

In some embodiments, the processor may determine the learning rate during training of the residual neural network based on a degree of difference of a plurality of samples in the sample dataset. For example, the greater the degree of difference, the smaller the learning rate.

In some embodiments, the degree of difference may be expressed based on a variance of the RGB three-channel data corresponding to the plurality of samples in the sample dataset. The greater the variance, the greater the degree of difference, the more difficult it is to predict the law of that sample dataset, and the more important it is to learn the hidden law of such samples. Therefore, the greater the degree of difference corresponding to the sample dataset, the greater the learning rate corresponding to the sample dataset.

The variance of the RGB three-channel data may include variances of red (Red), green (Green), and blue (Blue) channels. In some embodiments, the processor may average the variances of the red (Red), green (Green), and blue (Blue) channels for characterizing the degree of difference of the plurality of samples in the sample dataset.

In the process of model training, a learning rate that is too large may lead to dispersion of the model, and a learning rate that is too small may lead to slow convergence of the model. In some embodiments of the present disclosure, the processor may determine different learning rates for different sample datasets, which facilitates adapting to the features of different sample datasets, and prevents the model from being too dispersed, thereby improving the convergence speed, and increasing the success rate of model training.

Figure 4:
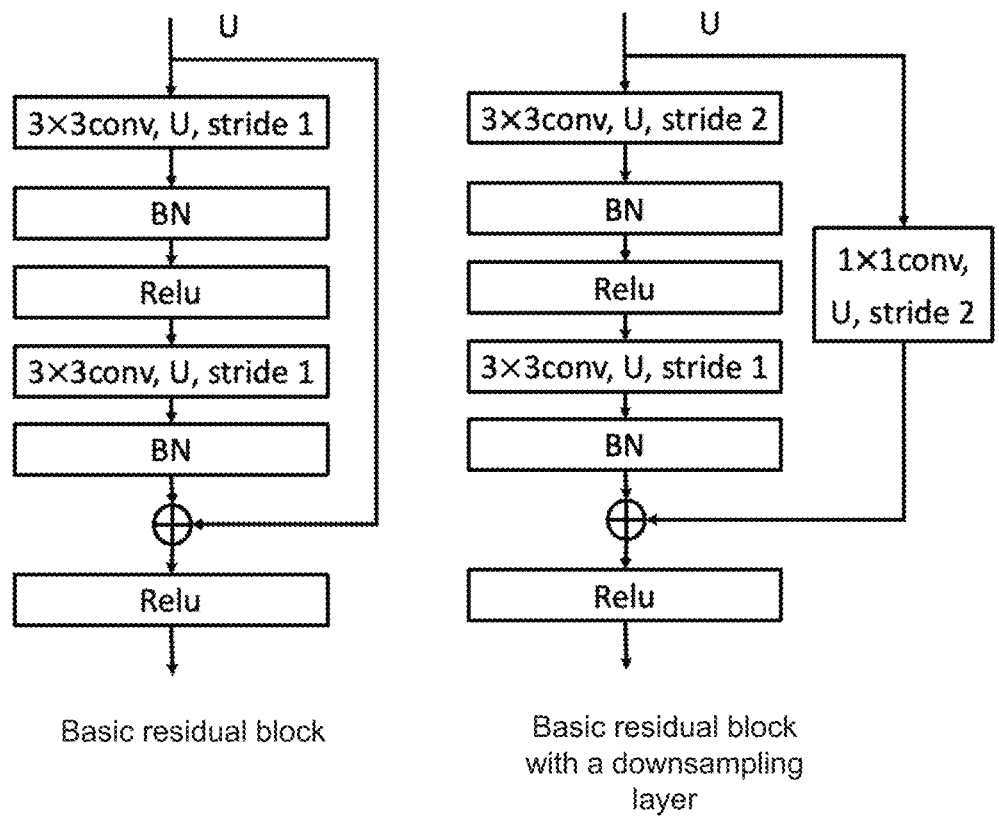
FIG. 4 is a schematic diagram illustrating a residual block of a residual neural network of a method for fast automatic calibration of a phased array based on a residual neural network according to some embodiments of the present disclosure.

FIG. 4 is a schematic diagram illustrating a residual block of a residual neural network of a method for fast automatic calibration of a phased array based on a residual neural network according to some embodiments of the present disclosure. The left shows a basic residual block containing two paths: one path is a normal path that passes through two convolution layers with a convolution kernel size of 3×3 and a step size 1, the two convolution layers being connected by a BN layer and an activation function layer; the other path is a residual path, where an input is an output and added to the normal path. The right shows a basic residual block with a downsampling layer, which contains two paths: one path is a normal path, in which the first convolution layer has a step size of 2 compared to the basic residual block, downsampling the input, with all other parameters constant; the other path is a residual path, where an input passes through a convolution layer with a convolution kernel size of 1×1 and a step size 2, downsampling the input such that an output size is the same as the output of the normal path.

Figure 5:
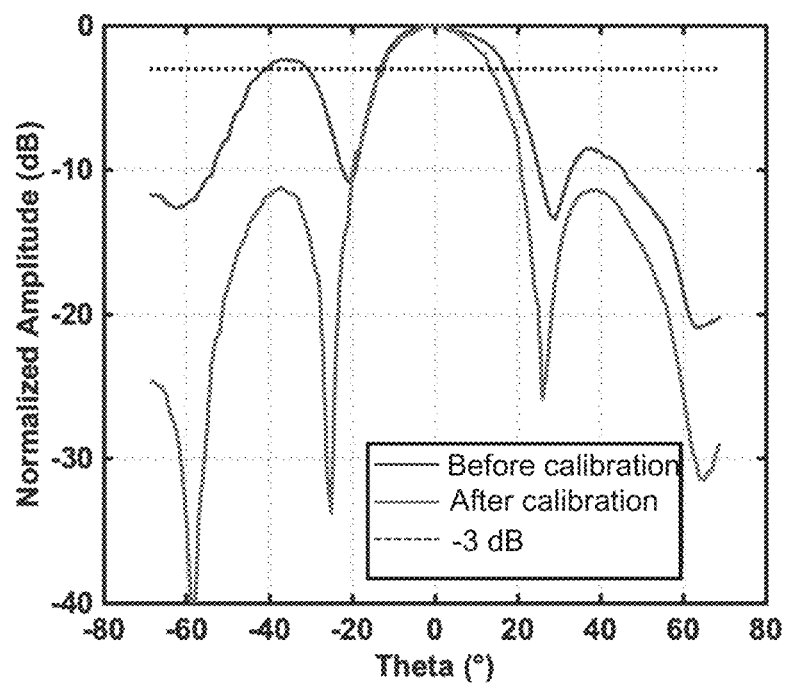
FIG. 5 is a comparison diagram illustrating far-field patterns before and after calibration of a 4×4 K-band analog phased array using a method for fast automatic calibration of a phased array based on a residual neural network according to some embodiments of the present disclosure.

FIG. 5 is a comparison diagram illustrating far-field patterns before and after calibration of a 4×4 K-band analog phased array using a method for fast automatic calibration of a phased array based on a residual neural network according to some embodiments of the present disclosure.

The far-field pattern refers to a pattern used to characterize a variation of a far-field signal intensity of a phased array with direction. A horizontal axis represents the direction, and a vertical axis represents a radiation intensity of an original signal.

The K-band analog phased array has a high operation frequency band and a large amplitude-phase error. Sidelobes are significantly reduced after calibration, and a width of a main lobe is reduced after calibration.

The main lobe refers to the strongest radiation lobe in the far-field pattern. The sidelobes refer to radiation lobes other than the main lobe in the far-field pattern.

Figure 6:
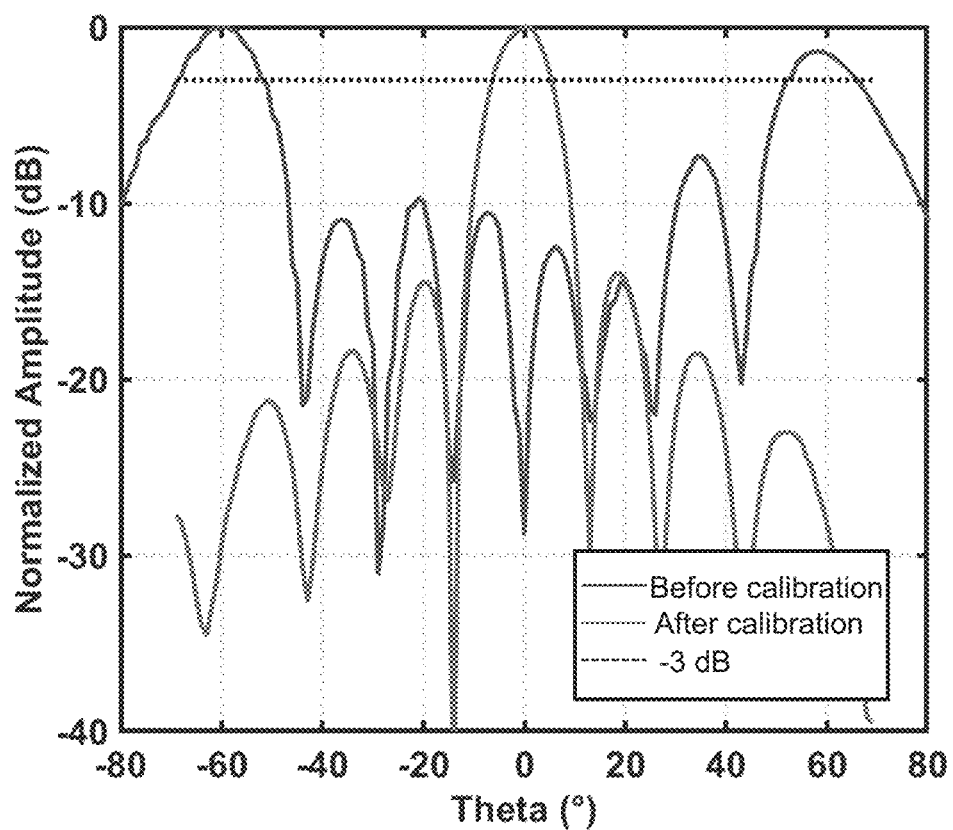
FIG. 6 is a comparison diagram illustrating far-field patterns before and after calibration of a 8×8 Ka-band analog phased array using a method for fast automatic calibration of a phased array based on a residual neural network according to some embodiments of the present disclosure.

FIG. 6 is a comparison diagram illustrating far-field patterns before and after calibration of a 8×8 Ka-band analog phased array using a method for fast automatic calibration of a phased array based on a residual neural network according to some embodiments of the present disclosure. A feeding mode of the array is rotating feeding. A phase error range is ±180°, and a count of array elements is high. Sidelobes of the array are higher than a main lobe before calibration. In this case, the algorithm may accurately estimate amplitude-phase errors, such that the sidelobes are significantly reduced.

Figure 7:
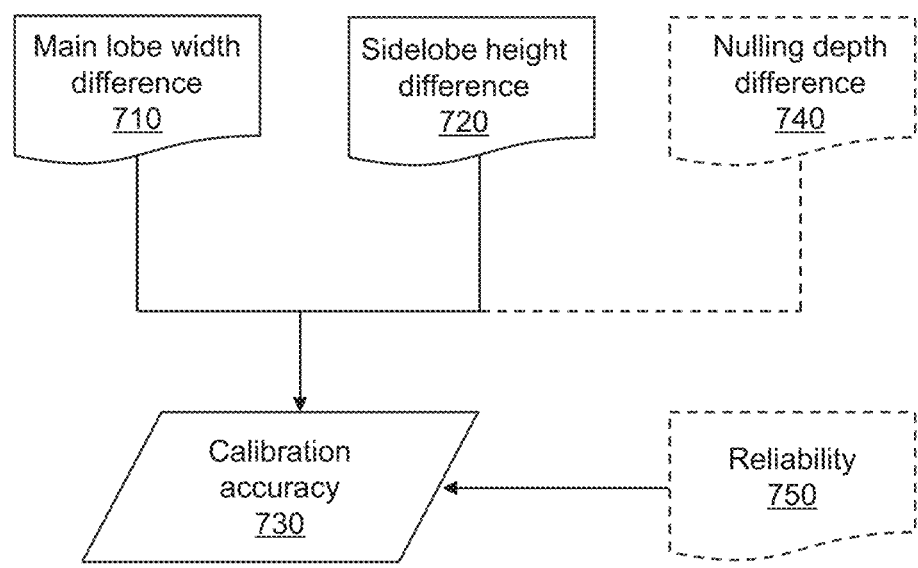
FIG. 7 is a schematic diagram illustrating a method for determining a calibration accuracy according to some embodiments of the present disclosure.

FIG. 7 is a schematic diagram illustrating a method for determining a calibration accuracy according to some embodiments of the present disclosure. In some embodiments, as shown in FIG. 7, the process of determining the calibration accuracy may include the following operations.

In some embodiments, a device for fast automatic calibration of a phased array based on a residual neural network may include a processor, a network analyzer, a probe, an anechoic chamber, a communication device, and a probe movement device.

More descriptions regarding the network analyzer and the anechoic chamber may be found in FIG. 1 and the related descriptions thereof.

The probe is a device for receiving a transmitting signal of the phased array. In some embodiments, the probe may be connected with the network analyzer to transmit a received array far-field complex signal to the network analyzer for measurement.

The communication device refers to a device that transmits data. In some embodiments, the communication device may be configured to perform data communication between the processor, the network analyzer, the probe, and the anechoic chamber.

The probe movement device refers to a device for placing and moving the probe. In some embodiments, the probe movement device may include at least one of a robotic arm and a pulley block. The processor may cause the robotic arm and/or the pulley block of the probe movement device to move through a control instruction to drive the probe to move to different positions.

The processor may be disposed in a remote computing device to process information and data generated during the calibration process of the phased array and issue the control instruction to complete the calibration process of the phased array.

In some embodiments, the processor may be further configured to determine a main lobe width difference 710 and a sidelobe height difference 720 from the array far-field complex signal, and determine a calibration accuracy 730 based on the main lobe width difference 710 and the sidelobe height difference 720.

The main lobe width difference refers to a deviation of an actual width of the main lobe in the array far-field complex signal from an ideal width of the main lobe. The ideal width of the main lobe refers to an expected main lobe width, and may be corrected with the objective of the calibration of the phased array, and may be set based on a processor default or preset by those skilled in the art based on priori experience.

The main lobe width may reflect a directionality and a resolution of the phased array. When a deviation of the actual width of the main lobe from the ideal width of the main lobe is too large, it may lead to a decrease in resolution, inaccurate signal transmission, or signal leakage.

In some embodiments, the processor may determine the actual width of the main lobe in the array far-field complex signal by measuring and analyzing the array far-field complex signal based on the network analyzer.

The sidelobe height difference refers to a deviation of an actual height of the sidelobes in the array far-field complex signal from an ideal height of the sidelobe. The ideal height of the sidelobes refers to a height at which the sidelobes are expected to reach, and may be correlated with the objective of the calibration of the phased array, and may be set based on the processor default or preset by those skilled in the art based on the priori experience.

The height of the sidelobes may reflect a potential interference level of the array far-field complex signal generated by the phased array. When the deviation of the height of the sidelobes from the ideal height of the sidelobes is too large, it may introduce unwanted noise interference and affects a signal-to-noise ratio of the system.

In some embodiments, the processor may determine the actual height of the sidelobes in the array far-field complex signal by measuring and analyzing the array far-field complex signal based on the network analyzer.

The calibration accuracy refers to a parameter for measuring an actual calibration effect of a calibration model. In some embodiments, the calibration accuracy may be expressed as a numerical value. The greater the calibration accuracy, the better the actual calibration effect of the calibration model.

In some embodiments, the calibration accuracy may be negatively correlated with the main lobe width difference 710 and the sidelobe height difference 720. For example, the processor may determine the calibration accuracy 730 based on the following formula (13):

$$Q = \frac{1}{r_1 * \Delta W + r_2 * \Delta H + \alpha} \quad \text{Formula (13)}$$

where Q denotes the calibration accuracy; $\Delta W$ denotes the main lobe width difference; $\Delta H$ denotes the sidelobe height difference; α denotes an adjustment coefficient greater than 0, which may be set based on the priori experience; and $r_1$, $r_2$ denotes weights, which may be set based on actual needs.

For example, the main lobe width difference is more important where a high directional resolution is required, in this case, $r_1$ may be set greater than $r_2$; and the sidelobe height difference is more critical where high interference suppression and confidentiality are required, in this case, $r_2$ may be set greater than $r_1$.

In some embodiments, the calibration accuracy 730 may be correlated with a nulling depth difference 740 of the array far-field complex signal before and after calibration.

The nulling depth difference refers to a difference in a nulling depth before and after calibration. The nulling depth refers to a depth of the lowest gain point in the array far-field complex signal.

In some embodiments, the processor may determine a difference between a nulling depth of the array far-field complex signal after calibration and a nulling depth of the array far-field complex signal before calibration as the nulling depth difference.

In some embodiments, the processor may determine an interference rejection capability of the array based on a magnitude of the nulling depth difference. For example, if the nulling depth difference is greater than 0, it indicates that the nulling depth difference significantly increases after calibration, the processor may determine that the current calibration improves the interference rejection capability of the array. If the nulling depth difference is less than 0, it indicates that the nulling depth difference decrease after calibration, the processor may determine that the phase or amplitude error in a transmission path or an antenna element is not sufficiently corrected. If the nulling depth difference is equal to 0, it indicates that the nulling depth difference does not change before and after the calibration, and there is no change in the interference rejection capability.

In some embodiments, the processor may determine the calibration accuracy 730 based on the main lobe width difference 710, the sidelobe height difference 720, and the nulling depth difference 740 by the following formula (14):

$$Q = \frac{r_3 * \Delta D * 1}{r_1 * \Delta W + r_2 * \Delta H + \alpha} \quad \text{Formula (14)}$$

where Q denotes the calibration accuracy; $\Delta W$ denotes the main lobe width difference; $\Delta H$ denotes the sidelobe height difference; $\Delta D$ denotes the nulling depth difference; α denotes the adjustment coefficient greater than 0, which may be set based on the priori experience; and $r_3$ denotes a weight, which may be set based on actual needs.

For example, when an interference direction is clear, the processor may appropriately increase $r_3$ based on historical data.

In some embodiments of the present disclosure, determining the calibration accuracy based on the nulling depth difference is conducive to more accurately detecting the interference rejection capability of the array, and adjusting the calibration accuracy based on the nulling depth difference in time, thereby improving the calibration effect of the array.

In some embodiments, the calibration accuracy may be correlated with a reliability 750 of the calibration model. The higher the reliability of the calibration model, the higher the corresponding calibration accuracy.

The reliability refers to a parameter used to measure a degree of reliability of an output result of the calibration model, which may be expressed as a numerical value. The higher the value, the higher the degree of reliability of the output result of the calibration model.

In some embodiments, the processor may also determine a plurality of candidate probe positions, collect a plurality of measured data of the array far-field complex signal at the plurality of candidate probe positions; input the plurality of measured data into the calibration model to obtain a plurality of error estimation results; and determine the reliability of the calibration model based on the plurality of error estimation results.

In some embodiments, the processor may randomly generate the plurality of candidate probe positions and control a network meter to measure a plurality of measured data of the array far-field complex signal at the plurality of candidate positions through the probe, and input the plurality of measured data into the calibration model to be evaluated to obtain the plurality of error estimation results.

In some embodiments, the processor may determine the reliability of the calibration model to be evaluated based on the plurality of error estimation results. For example, the processor may calculate variances of the plurality of error estimation results and determine the reliability of the calibration model based on the variances. The higher the variance, the lower the reliability.

In some embodiments of the present disclosure, the plurality of error estimation results are obtained based on the measured data of the plurality of candidate probes, and the reliability of the calibration model is further determined, which facilitates detecting the reliability of the calibration model based on the calibration of the different probe positions, so as to more comprehensively evaluate the calibration accuracy of the calibration model.

In some embodiments of the present disclosure, the calibration accuracy is determined based on the main lobe width difference and the sidelobe height difference, which facilitates reasonably calibrating the main lobe width and the sidelobe height based on the demand of an actual scenario, thereby reducing signal leakage or inaccurate positioning by the calibration of the main lobe width, enhancing interference rejection in a strong interference environment by the calibration of the sidelobe height, and improving the of confidentiality of communication.

Figure 8:
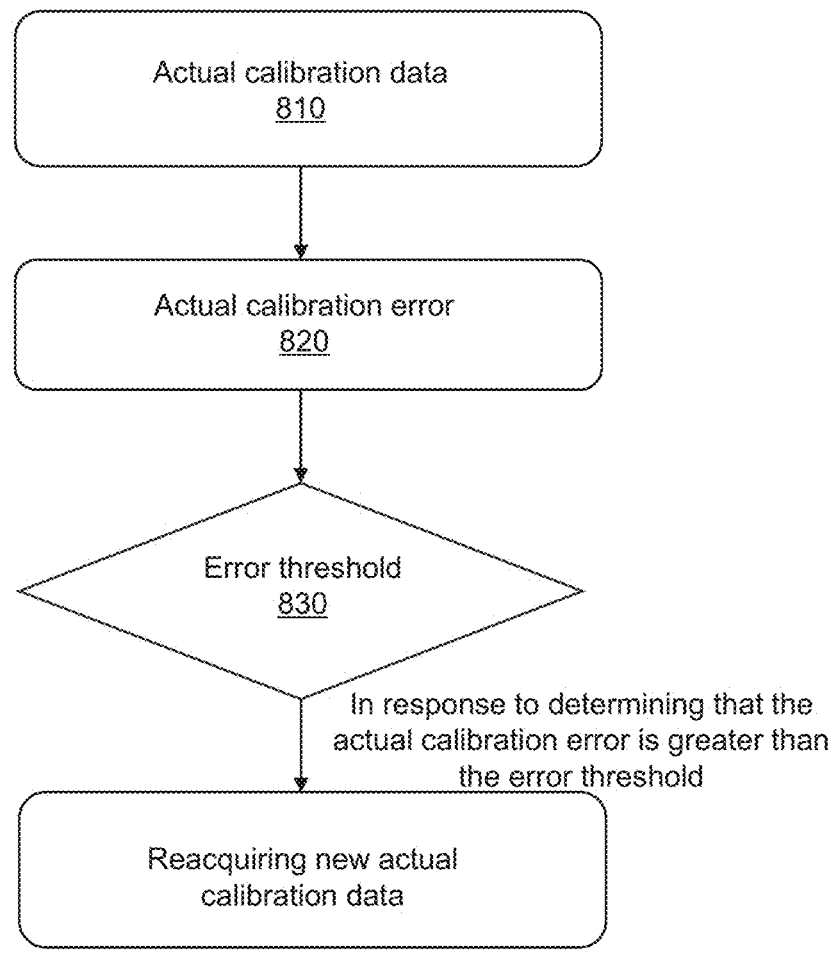
FIG. 8 is a schematic diagram illustrating a process of performing an actual calibration according to some embodiments of the present disclosure.

FIG. 8 a schematic diagram illustrating a process of performing an actual calibration according to some embodiments of the present disclosure. In some embodiments, as shown in FIG. 8, the process of performing the actual calibration may include the following operations.

Compared with the environment of an anechoic chamber, in an actual application scenario of a phased array, there are often various interference factors, such as environmental factors, other interference signals, or the like. In order to ensure that the trained calibration model also has a good performance in the actual application scenario, it is necessary to evaluate the calibration model based on actual calibration data.

In some embodiments, the processor may determine an actual calibration error 820 based on actual calibration data 810, and recalibrate the phased array in the actual scenario in response to determining that the actual calibration error 820 is greater than an error threshold 830.

The actual calibration data is an array far-field complex signal obtained when the phased array is calibrated in the actual application scenario. The actual application scenario refers to a scenario in which the phased array is planned to be applied, not a laboratory environment (e.g., the anechoic chamber).

In some embodiments, the actual application scenario may include, but is not limited to, at least one of data transmission and wireless communication, radar detection, or space optical communication.

In some embodiments, the processor may set up a phase setting matrix, sequentially change a phase shifter of the phased array in the actual application scenario based on the phase setting matrix, and measure the array far-field complex signal of the phased array in the actual application scenario through a network analyzer to obtain a far-field complex signal vector in the actual application environment. The process is similar to that of obtaining the far-field complex signal vector Y in the anechoic chamber. More descriptions may be found in FIG. 1 and the related descriptions thereof.

The actual calibration error refers to a result of amplitude-phase error estimation of the far-field complex signal vector during calibration in the actual application scenario.

In some embodiments, the processor may perform feature extraction on the far-field complex signal vector in the actual application environment, separate a real part, an imaginary part, and a magnitude of the far-field complex signal vector, and perform normalization, and then obtain RGB three-channel image data in the actual application scene by mapping; and obtain the actual calibration error by inputting the RGB three-channel image data in the actual application scenario into the trained calibration model. The process is similar to the process of estimating the amplitude-phase error in the anechoic chamber. More descriptions may be found in FIG. 1 and the related descriptions thereof.

In some embodiments, in response to determining that the actual calibration error is greater than an error threshold, the processor may recalibrate the phased array in the actual scenario. The process is similar to the process of performing calibration in the anechoic chamber. More descriptions may be found in FIG. 1 and the related descriptions thereof.

The error threshold may be determined in various ways. In some embodiments, the error threshold may be set based on priori experience and/or actual needs.

In some embodiments, the error threshold may be correlated with an atmospheric refractive index. The processor may determine the error threshold based on the atmospheric refractive index. In the actual application scenario, atmospheric refractive index affects a propagation path of the phased array signal, which affects the beam pointing and accuracy of the phased array signal, and when the atmospheric refractive index is too high, the signal propagation path deviates, resulting in signal attenuation and increasing a signal transmission error. Therefore, the higher the atmospheric refractive index, the higher the corresponding error threshold, so as to better adapt to the actual environment.

In some embodiments, in response to determining that the error threshold not satisfy a preset condition, the obtained actual calibration data is discarded and new actual calibration data is reacquired. The preset condition may be correlated with a tolerance of the error threshold, which may be determined based on a maximum value of the output result of the calibration model in the historical data when both the calibration accuracy and the reliability value are greater than thresholds corresponding to the calibration accuracy and the reliability value, respectively. The threshold corresponding to each of the calibration accuracy and the reliability value may be set based on the priori experience.

When the error threshold is greater than the tolerance, it means that at this time a higher error threshold is set due to the higher atmospheric refractive index, and the interference factors are stronger in such an environment, which affects the calibration accuracy. The processor may determine that the current environment is not suitable for calibration. Therefore, the calibration data obtained in the current environment may be discarded, and new actual calibration data may be reacquired when the environment permits, i.e., when the error threshold is not greater than the tolerance, and the atmospheric refractive index is within a reasonable range.

The actual application scenario of the phased array is more complex than the laboratory environment. In some embodiments of the present disclosure, by further calibrating the phased array in the actual application scenario and considering the effects of actual environmental factors, such as the atmospheric reflective index, on the calibration process, the calibration accuracy of the phased array can be improved, and the calibration result is more consistent with the actual environment.

Some embodiments of the present disclosure further provide a device for fast automatic calibration of a phased array based on a residual neural network. The device may include a storage device and a processor connected with the storage device. The processor may be configured to perform the method for fast automatic calibration of the phased array based on the residual neural network. The method may include: setting a phase setting matrix, sequentially changing a phase shifter of each antenna element in the phased array, and measuring an amplitude and a phase of an array far-field complex signal corresponding to each antenna element with a network analyzer to obtain a amplitude and phase vector of the array far-field complex signal of which a magnitude is equal to a count of measurements; performing feature extraction on the amplitude and phase vector, separating and normalizing a real part, an imaginary part, and a magnitude of a value the measured array far-field complex signal, and mapping to RGB three-channel image data; constructing the residual neural network and automatically generating a large number of datasets according to a preset amplitude-phase error range by a simulation software, proportionally dividing the datasets into a training set and a test set and inputting the training set and the test set into the residual neural network for training to obtain a calibration model; inputting measured data into the calibration model for automatic estimation of an amplitude-phase error of the phased array; and determining a main lobe width difference and a sidelobe height difference value from the array far-field complex signal, and determining a calibration accuracy based on the main lobe width difference and the sidelobe height difference.

Some embodiments of the present disclosure further provide a non-transitory computer storage medium comprising computer programs that, when executed by a computer, may direct the computer to implement the method for fast automatic calibration of the phased array based on the residual neural network.

Some embodiments of the present disclosure are intended to solve the problem that large phased arrays are inconsistent in the magnitude and phase of each channel due to manufacturing errors, production inaccuracies, and non-uniform mutual coupling between antennas, which cause the beam deviating from the expected value. By extracting sufficient array error information for high-precision calibration from the count of measurements equal to the count of array elements plus one using a new feature extraction solution, and fast and automatic calibration of the phased array error is realized by the calibration model trained based on the residual neural network, which effectively reduces the count of measurements. In addition, the training set of the neural network may be directly applied to the actual antenna calibration by only being generated through simulation, which is of high value for practical application. Fast and automatic calibration for the phased array can be realized by the method, and the trained calibration model can be directly applied to the phased arrays in all frequency bands.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for fast automatic calibration of a phased array based on a residual neural network, comprising:

S1: setting a phase-setting matrix, changing a phase shifter of each antenna element in the phased array in turn, and measuring an amplitude and a phase of an array far-field complex signal corresponding to each antenna element with a network analyzer to obtain an amplitude and phase vector of the array far-field complex signal of which a magnitude is equal to a count of measurements;

S2: performing feature extraction on the amplitude and phase vector, separating and normalizing a real part, an imaginary part, and a magnitude of a measured value of the array far-field complex signal, and mapping to RGB three-channel image data;

S3: constructing the residual neural network and automatically generating a large number of datasets according to a preset amplitude-phase error range by a simulation software, proportionally dividing the datasets into a training set and a test set and inputting the training set and the test set into the residual neural network for training to obtain a calibration model;

S4: inputting measured data into the calibration model for automatic estimation of the amplitude-phase error of the phased array;

S1.1: assuming that the phased array of size $N_x \times N_y$ is used as an antenna under test, a transmitting antenna being a single probe, and performing calibration in an anechoic chamber;

a signal angle of the probe to a planar array being denoted as $(\theta, \varphi)$, where $\theta$ denotes a pitch angle, and $\varphi$ denotes an azimuth angle, modeling a received signal y of the phased array under an ideal condition as:

$y = X(\theta, \varphi) \odot s + n$ where s denotes a signal from a probe of size $N_x N_y \times 1$, n denotes a measurement noise matrix in an anechoic chamber of size $N_x N_y \times 1$, $\odot$ denotes a Hadamard product; and $X(\theta, \varphi)$ denotes a direction vector at $(\theta, \varphi)$ of an array of size $N_x N_y \times 1$;

modeling an amplitude-phase error as an error matrix A of size $N_x N_y \times N_x N_y$:

$$A = \begin{bmatrix} a_1 e^{-i\omega_1} & 0 & \cdots & 0 \\ 0 & a_2 e^{-i\omega_2} & \vdots & 0 \\ \vdots & \vdots & \cdots & \vdots \\ 0 & 0 & \cdots & a_{N_x N_y} e^{-i\omega_{N_x N_y}} \end{bmatrix}$$

where $a_j$ denotes an initial amplitude error of a jth array element, and $w_j$ denotes an initial phase error of the jth array element;

S1.2: in order to obtain amplitude-phase error information of each array element, setting a phase setting matrix P of size $L \times N_x N_y$:

$$P = \begin{bmatrix} \vartheta_{1,1} & \vartheta_{1,2} & \cdots & \vartheta_{1,N_x N_y} \\ \vartheta_{2,1} & \vartheta_{2,2} & \vdots & \vartheta_{2,N_x N_y} \\ \vartheta_{3,1} & \vartheta_{3,2} & \cdots & \vartheta_{3,N_x N_y} \\ \vdots & \vdots & \ddots & \vdots \\ \vartheta_{L,1} & \vartheta_{L,2} & \cdots & \vartheta_{L,N_x N_y} \end{bmatrix}$$

where each row of P represents a phase value corresponding to a phase shifter of each array element of the phased array of size $N_x \times N_y$ in a phase shift, and L denotes the count of measurements;

S1.3: after measuring amplitude and phase data of the array far-field complex signal of the phased array by setting different phases for the phase shifter, obtaining a far-field complex signal vector Y of the phased array of size $L \times 1$:

$Y = PAX(\theta, \phi) \odot s + n;$ where the operation S1.2 includes:

S1.2.1: in order to obtain the amplitude-phase error information of all the array elements, the phase setting matrix P satisfying the following equation:

$$\text{rank}(P) \geq N_x N_y$$

where rank(P) denotes a rank of the matrix;

S1.2.2: wherein a construction process of a small phase setting matrix $P_s$ including:

$$P_s = \begin{bmatrix} 0 & 0 & \cdots & 0 \\ \pi & 0 & \vdots & 0 \\ 0 & \pi & \cdots & 0 \\ \vdots & \vdots & \ddots & \vdots \\ 0 & 0 & \cdots & \pi \end{bmatrix}$$

firstly, measuring a far-field amplitude and phase of the phased array at $(\theta,\phi)$, where all the array elements do not perform phase shifting, corresponding to a first row of $P_s$;

then, moving a phase of a phase shifter of an individual array element by 180° in the order of the array elements, and measuring the far-field amplitude and phase at $(\theta,\phi)$, corresponding to a second row to a $(N_x N_y+1)$th row of $P_s$, to obtain a far-field complex signal vector Y of size $(N_x N_y+1) \times 1$;

where the operation S2 includes:

S2.1: reconstructing the received far-field complex signal vector Y of the phased array as a complex signal matrix $\tilde{Y}$ of size $\lceil \sqrt{L} \rceil \times \lceil \sqrt{L} \rceil$:

$$\tilde{Y} = \begin{bmatrix} Y(1) & Y(2) & \cdots & Y(\lceil \sqrt{L} \rceil) \\ Y(\lceil \sqrt{L} \rceil+1) & Y(\lceil \sqrt{L} \rceil+2) & \vdots & Y(2\lceil \sqrt{L} \rceil) \\ Y(2\lceil \sqrt{L} \rceil+1) & Y(2\lceil \sqrt{L} \rceil+2) & \cdots & Y(3\lceil \sqrt{L} \rceil) \\ \vdots & \vdots & \ddots & \vdots \\ Y(\lceil \sqrt{L} \rceil^2 - \lceil \sqrt{L} \rceil+1) & Y(\lceil \sqrt{L} \rceil^2 - \lceil \sqrt{L} \rceil+2) & \cdots & 0 \end{bmatrix}$$

where $\lceil \cdot \rceil$ denotes rounding up; the elements in Y are populated into $\tilde{Y}$ in the order of the rows;

when $\lceil \sqrt{L} \rceil^2 > L$, a count of measured far-field amplitudes and phases of the phased array are not exactly populated into the whole matrix $\tilde{Y}$, and thus the remaining of $\tilde{Y}$ is populated with 0;

S2.2: calculating three feature matrices, i.e., a real part matrix $\tilde{Y}_{real}$, an imaginary part matrix $\tilde{Y}_{imag}$, and a magnitude matrix $\tilde{Y}_{am}$, and normalizing and mapping the three feature matrices to the RGB three-channel image data:

$$\tilde{Y}_{real} = \frac{255(\text{Re}(\tilde{Y}) + \max(|\tilde{Y}|))}{2\max(|\tilde{Y}|)}$$

$$\tilde{Y}_{imag} = \frac{255(\text{Im}(\tilde{Y}) + \max(|\tilde{Y}|))}{2\max(|\tilde{Y}|)}$$

$$\tilde{Y}_{am} = \frac{255|\tilde{Y}|}{\max(|\tilde{Y}|)}$$

Where $\text{Re}(\tilde{Y})$ denotes the real part of the matrix, $\text{Im}(\tilde{Y})$ denotes the imaginary part of the matrix, and $\max(|\tilde{Y}|)$ denotes a maximum value of the matrix.

2. The method of claim 1, where the direction vector $X(\theta,\phi)$ is calculated as follows:

$$X(\theta, \varphi) = Tx(\theta) \otimes Ty(\varphi)$$

$$\begin{cases} Tx(\theta) = \left[1, e^{j2\pi \frac{d_x}{\lambda} \sin\theta \sin\varphi}, \ldots, e^{j2\pi(N_x-1)\frac{d_x}{\lambda}\sin\theta\sin\varphi}\right]^T \\ Ty(\varphi) = \left[1, e^{j2\pi \frac{d_y}{\lambda} \sin\theta \cos\varphi}, \ldots, e^{j2\pi(N_y-1)\frac{d_y}{\lambda}\sin\theta\cos\varphi}\right]^T \end{cases}$$

where $\lambda$ denotes a wavelength, and dx and dy denote an element spacing of array elements in rows and an element spacing of array elements in columns, respectively, $Tx(\theta)$ denotes a direction vector of an array of size $N_x N_y \times 1$ in a direction $\theta$, $Ty(\phi)$ denotes a direction vector of an array of size $N_x N_y \times 1$ in a direction $\phi$ and T indicates the transpose of a matrix.

3. The method of claim 1, where the operation S3 includes:

S3.1: constructing the residual neural network;

S3.2: assuming that a range of an array element phase error is $\pm\omega_{all}$, and a range of an array element amplitude error is $\pm I_{all}$, generating M sets of amplitude-phase errors based on $\pm\omega_{all}$ and $\pm I_{all}$ by the simulation software;

calculating a complex form of a corresponding array element amplitude-phase error based on the amplitude-phase errors, and dividing the complex form of the corresponding array element amplitude-phase error into a real part vector of size $N_x N_y \times 1$ and an imaginary part vector of size $N_x N_y \times 1$ as labels of the datasets of the neural network, the size of the label corresponding to each dataset being $2 N_x N_y \times 1$;

S3.3: calculating array element far-field complex signal vectors corresponding to the M sets of amplitude-phase errors according to the operation S1;

S3.4: calculating the RGB three-channel image data corresponding to the M array element far-field complex signal vectors according to the operation S2 as datasets for training of the neural network; and S3.5: proportionally dividing the M datasets into the training set and the test set to input into the constructed neural network for training to obtain the calibration model.

4. The method of claim 3, where the residual neural network constructed in the operation S3.1 includes five convolution sets, including conv1, conv2, conv3, conv4, and conv5; where the conv1 includes a basic convolution computation process, which sequentially consists of a convolution layer with a convolution kernel of size 3×3 and a step size 1, a batch normalization layer, and an activation function layer using a Relu activation function, and is connected with a maximum pooling layer of size 3×3 and a step size 1;

the conv2 includes two identical basic residual blocks; and each of the conv3, the conv4, and the conv5 includes a basic residual block with a downsampling layer and a basic residual block, where a first residual block is the basic residual block with the downsampling layer, a step size of a first convolution layer of the basic residual block with the downsampling layer is 2 for downsampling, and other parameters are the same.

5. A device for fast automatic calibration of the phased array based on a residual neural network, comprising: a storage device; and a processor connected with the storage device, where
  the processor is configured to perform the method of claim 1.

6. A non-transitory computer storage medium storing computer programs that, when executed by a computer, direct the computer to implement the method of claim 1.

* * * * *